(12) United States Patent
Mizutani et al.

(10) Patent No.: US 9,145,166 B2
(45) Date of Patent: Sep. 29, 2015

(54) MOMENTUM CONTROL APPARATUS

(75) Inventors: Yuichi Mizutani, Aichi-ken (JP);
Hirofumi Nitta, Obu (JP); Junpei Tatsukawa, Chiryu (JP); Mitsuhiro Tokimasa, Obu (JP); Yasuhiko Mukai, Anjo (JP); Yoshihisa Ogata, Chiryu (JP); Hajime Kumabe, Kariya (JP); Masatoshi Hanzawa, Kariya (JP); Masaki Maruyama, Nagoya (JP)

(73) Assignees: AISIN SEIKI KABUSHIKI KAISHA, Kariya-Shi, Aichi-Ken (JP); DENSO CORPORATION, Kariya-Shi, Aichi-Ken (JP); ADVICS CO., LTD., Kariya-Shi, Aichi-Ken (JP)

( * ) Notice: Subject to any disclaimer, the term of this patent is extended or adjusted under 35 U.S.C. 154(b) by 140 days.

(21) Appl. No.: 13/283,106

(22) Filed: Oct. 27, 2011

(65) Prior Publication Data
US 2012/0109464 A1    May 3, 2012

(30) Foreign Application Priority Data
Oct. 29, 2010    (JP) ................. 2010-243406

(51) Int. Cl.
*G06F 7/00*    (2006.01)
*B62D 6/00*    (2006.01)
*B60W 10/184*    (2012.01)
(Continued)

(52) U.S. Cl.
CPC ............. *B62D 6/003* (2013.01); *B60W 10/184* (2013.01); *B60W 10/20* (2013.01); *B60W 30/02* (2013.01); *B60W 30/09* (2013.01); *B60W 30/12* (2013.01); *B60W 2050/0008* (2013.01); *B60W 2050/0013* (2013.01); *B60W 2050/0024* (2013.01); *B60W 2050/0026* (2013.01); *B60W 2720/14* (2013.01)

(58) Field of Classification Search
CPC ... B60W 10/184; B60W 30/02; B60W 10/20; B60W 2050/0013; B60W 30/09
USPC .......................................... 701/1, 41, 42, 74
See application file for complete search history.

(56) References Cited

U.S. PATENT DOCUMENTS 4,862,372 A * 8/1989 Appleford ................... 701/5
6,856,886 B1   2/2005 Chen et al.
(Continued)

FOREIGN PATENT DOCUMENTS

DE    102005013255 A1    10/2005
JP       05-185944 A       7/1993
(Continued)

OTHER PUBLICATIONS

Japanese Office Action dated Feb. 26, 2014 issued in the corresponding Japanese Patent Application No. 2010-243406 and partial English language translation.
(Continued)

*Primary Examiner* — Redhwan K Mawari
*Assistant Examiner* — Rodney P King
(74) *Attorney, Agent, or Firm* — Buchanan Ingersoll & Rooney PC

(57) ABSTRACT

The momentum control apparatus includes: an optimal feedback gain obtaining part for obtaining a plurality of optimal feedback gains used when each of the plurality of actuators is independently actuated to feedback control the momentum of the controlled object; and a feedback gain setting part for extracting a minimum feedback gain out of the plurality of optimal feedback gains obtained by the optimal feedback gain obtaining part as a feedback gain of a control system.

5 Claims, 7 Drawing Sheets

(51) Int. Cl.
   *B60W 10/20*   (2006.01)
   *B60W 30/02*   (2012.01)
   *B60W 30/09*   (2012.01)
   *B60W 30/12*   (2006.01)
   *B60W 50/00*   (2006.01)

(56) References Cited

U.S. PATENT DOCUMENTS

| | | | |
|---|---|---|---|
| 7,379,809 B2 | 5/2008 | Yasui et al. | |
| 2001/0046926 A1* | 11/2001 | Adachi et al. | 477/108 |
| 2009/0037053 A1* | 2/2009 | Yamazaki | 701/41 |

FOREIGN PATENT DOCUMENTS

| | | |
|---|---|---|
| JP | 07-084648 A | 3/1995 |
| JP | 2005-299424 A | 10/2005 |

OTHER PUBLICATIONS

German Office Action dated Mar. 12, 2015 issued in the corresponding German Patent Application No. 102011085423.1 and English translation (11 pages).

* cited by examiner

FIG.6

| V | Kp_FSTR_OPT | Kp_RSTR_OPT | Kp_DYC_OPT |
|---|---|---|---|
| V1 | K1p_FSTR | K1p_RSTR | K1p_DYC |
| V2 | K2p_FSTR | K2p_RSTR | K2p_DYC |
| V3 | K3p_FSTR | K3p_RSTR | K3p_DYC |
| V4 | K4p_FSTR | K4p_RSTR | K4p_DYC |
| V5 | K5p_FSTR | K5p_RSTR | K5p_DYC |
| ⋮ | ⋮ | ⋮ | ⋮ |

FIG.7

| Kp_*_OPT | Ki_*_OPT | Kd_*_OPT |
|---|---|---|
| K1p_* | K1i_* | K1d_* |
| K2p_* | K2i_* | K2d_* |
| K3p_* | K3i_* | K3d_* |
| K4p_* | K4i_* | K4d_* |
| K5p_* | K5i_* | K5d_* |
| ⋮ | ⋮ | ⋮ |

FIG.8

| w | Kp_FSTR_OPT | Kp_RSTR_OPT | Kp_DYC_OPT |
|---|---|---|---|
| w1 | K1p_FSTR | K1p_RSTR | K1p_DYC |
| w2 | K2p_FSTR | K2p_RSTR | K2p_DYC |
| w3 | K3p_FSTR | K3p_RSTR | K3p_DYC |
| w4 | K4p_FSTR | K4p_RSTR | K4p_DYC |
| w5 | K5p_FSTR | K5p_RSTR | K5p_DYC |
| ⋮ | ⋮ | ⋮ | ⋮ |

FIG.9

| X(%) | Kp_FSTR_OPT | Kp_RSTR_OPT | Kp_DYC_OPT |
|---|---|---|---|
| 0 | K0p_FSTR | K0p_RSTR | K0p_DYC |
| 1 | K1p_FSTR | K1p_RSTR | K1p_DYC |
| 2 | K2p_FSTR | K2p_RSTR | K2p_DYC |
| 3 | K3p_FSTR | K3p_RSTR | K3p_DYC |
| ⋮ | ⋮ | ⋮ | ⋮ |
| 97 | K97p_FSTR | K97p_RSTR | K97p_DYC |
| 98 | K98p_FSTR | K98p_RSTR | K98p_DYC |
| 99 | K99p_FSTR | K99p_RSTR | K99p_DYC |
| 100 | K100p_FSTR | K100p_RSTR | K100p_DYC |

MOMENTUM CONTROL APPARATUS

TECHNICAL FIELD

This disclosure relates to a momentum control apparatus for feedback-controlling the momentum of a control object by using a plurality of actuators. This disclosure particularly relates to a lateral momentum control apparatus for feedback-controlling the lateral momentum of a moving vehicle by using a plurality of actuators.

BACKGROUND DISCUSSION

In recent years, driving assistance apparatuses (called "driving assistance applications" hereinafter) that assist in the driving of a moving vehicle are being developed. For example, lane keeping apparatuses that automatically steers or assist in driving so that vehicles travel along a road, lane departure prevention apparatuses that assist in driving by preventing vehicles from departing from their lanes, emergency avoidance apparatuses that automatically steer vehicles in order to avoid obstructions on the traveled road surface, and so on are being developed.

Request signals outputted from a driving assistance application such as a lane keep apparatus, a lane departure prevention apparatus, or an emergency avoidance apparatus (for example, a signal indicating a target lateral acceleration) are inputted into a lateral momentum control apparatus that controls the lateral momentum (for example, the yaw rate) of the vehicle. Control signals are outputted from this control apparatus to a control target such as an actuator. The lateral momentum of the vehicle is controlled as a result of actuation of the actuator controlled on the basis of the control signals.

The lateral momentum of the vehicle is changed by using various actuators attached to the vehicle. For example, a front steering actuator changes the lateral momentum of the vehicle by turning the front wheels. A rear steering actuator changes the lateral momentum of the vehicle by turning the rear wheels. Further, an actuator for imparting a braking force or a driving force to each wheel individually (DYC actuator) changes the lateral momentum of the vehicle, for example, by imparting a braking force (or a driving force) to the right wheels or the left wheels of the vehicle.

In the case of feedback-controlling the lateral momentum of the vehicle on the basis of the request signal outputted from a certain driving assistance application, the feedback control is performed on the basis of a deviation (difference) between a target lateral momentum and an actual lateral momentum. At this time, in the case of controlling the lateral momentum of the vehicle by using a plurality of actuators, an optimal feedback gain is individually set with respect to each actuator. Thereafter, a feedback control amount is calculated on the basis of the set feedback gain, and each actuator is operated independently on the basis of the calculated feedback control amount.

In the case that the plurality of actuators are actuated independently of each other in order to feedback-control the lateral momentum of the vehicle on the basis of the request signal outputted from the driving assistance application, there is a concern about an actuation interference between the actuators. For example, the following situation can be expected. One actuator is actuated to turn the vehicle to the right and another actuator is actuated to turn the vehicle to the left. When the actuation interference between actuators occurs as described above, the behavior of the vehicle is destabilized.

To cope with this problem, the feedback control amounts of the actuators are not individually determined, but the feedback control amount of the entire control system is determined, and then the determined feedback control amount is distributed to the actuators, thereby preventing the actuation interference between the actuators.

JP2005-299424 A discloses a control apparatus for controlling an output of the controlled object by a plurality of control inputs. According to this control apparatus described in JP2005-299424 A, a plurality of control inputs are individually calculated with sharing one filtering target value, thereby preventing a mutual interference between a plurality of feedback control processes using the plurality of control inputs.

SUMMARY

In setting a feedback gain of the entire control system, consideration is made on an optimal feedback gain for each actuator. The optimal feedback gains, which are set for each actuator, however, are different one another since a responsiveness or the like of each actuator differs. For example, in the case the lateral momentum of the vehicle is controlled by using a front steering actuator and a DYC actuator according to the request signal outputted from the driving assistance application, in some cases, the optimal feedback gain of the front steering actuator is set to 1.5 and the optimal feedback gain of t the DYC actuator is set to 2.0. In this case, if the feedback gain of the control system is set to 2.0, the control amount of the front steering actuator overshoots. The overshoot leads to destabilization of the turning behavior of the vehicle. Thus, a need exists for a momentum control apparatus which is not susceptible to the drawback mentioned above.

According to the aspect of this disclosure, a momentum control apparatus (40) for feedback-controlling the momentum of a controlled object by using a plurality of actuators (14, 22, 32) includes, a target momentum obtaining part (411 or 415a) for obtaining a target momentum ($\gamma^*$ or $\gamma\_{ref}$) of the controlled object, an optimal feedback gain obtaining part (S12) for obtaining a plurality of optimal feedback gains used when each of the plurality of actuators is independently actuated to feedback-control the momentum of the controlled object, with respect to each of actuators, a feedback gain setting part (S18) for extracting a minimum feedback gain out of the plurality of optimal feedback gains obtained by the optimal feedback gain obtaining part, and for setting the minimum feedback gain as a feedback gain of a control system; a control amount calculation part (415a) for calculating a feedback control amount on the basis of the feedback gain set by the feedback gain setting part and a deviation between the target momentum and the current momentum ($\gamma$) of the controlled object, and an actuator control part (42, 43, 44) for controlling the actuation of the plurality of actuators on the basis of the feedback control amount.

BRIEF DESCRIPTION OF THE DRAWINGS

The foregoing and additional features and characteristic of this disclosure will become more apparent from the following detailed description considered with the reference to the accompanying drawings, wherein:

FIG. 6 is a diagram illustrating an example of a vehicle speed—optimal proportional gain table representing the relation between optimal proportional gain and vehicle speed;

FIG. 7 is a diagram illustrating an example of a $K_p$-$K_i$-$K_d$ correspondence gain table representing the relation between $K_p$, $K_i$ and $K_d$;

FIG. 8 is a diagram illustrating an example of a disturbance-optimal proportional gain table representing the relation between optimal proportional gain and disturbance; and FIG. 9 is a diagram illustrating an example of a target value achievement rate-optimal proportional gain table representing the relation between target-value-achievement-rate and optimal proportional gain.

DETAILED DESCRIPTION

Figure 1:
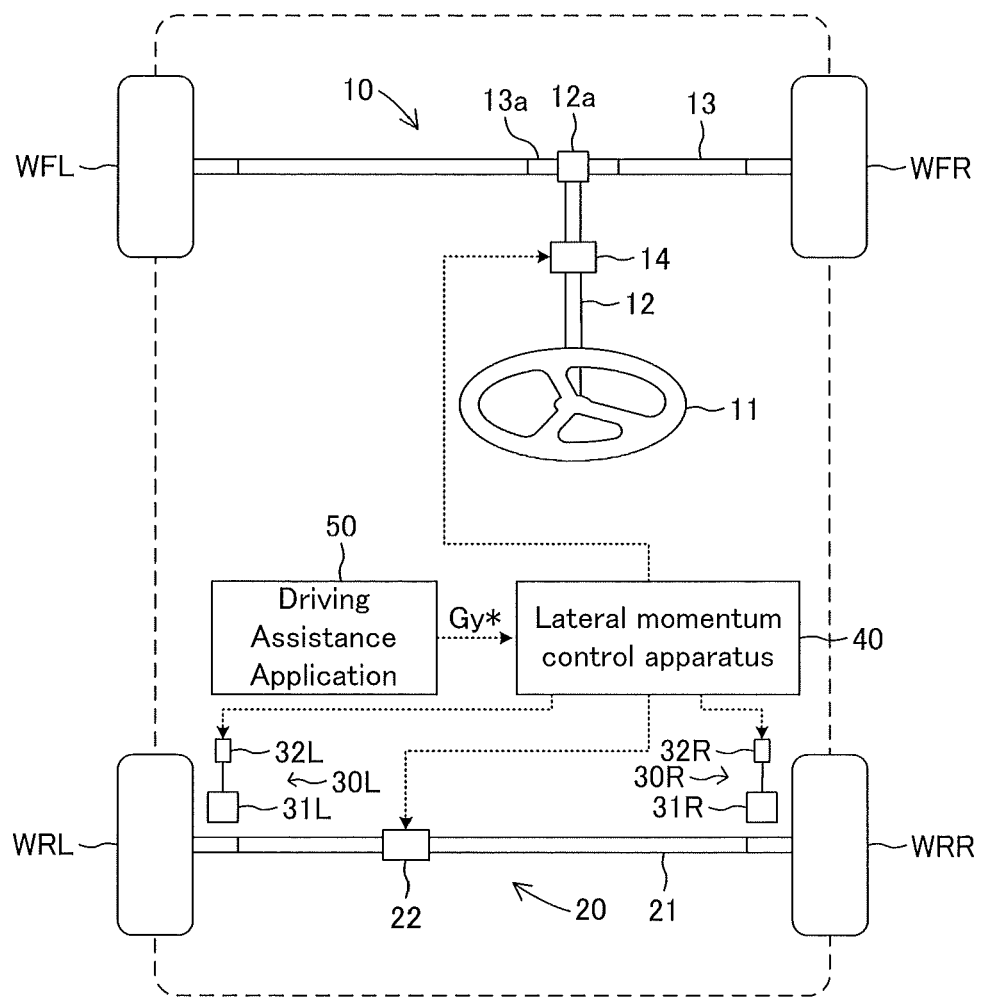
FIG. 1 is a schematic diagram of a vehicle on which a momentum control apparatus according to an embodiment is mounted.

Hereinafter, the embodiment will be described with reference to appended drawings. FIG. 1 is a schematic diagram of a vehicle on which a momentum control apparatus according to this embodiment is mounted. As illustrated in the drawing, the vehicle includes a front steering apparatus 10, a rear steering apparatus 20, and rear wheel braking apparatus 30R and 30L. The front steering apparatus 10 imparts a steering force to a left front wheel WFL and a right front wheel WFR to turn these wheels. The rear steering apparatus 20 imparts a steering force to a left rear wheel WRL and a right rear wheel WRR to turn these wheels. The rear wheel braking apparatus 30R imparts a braking force to the right rear wheel WRR. The rear wheel braking apparatus 30L imparts a braking force to the left rear wheel WRL. In addition, the vehicle is also provided with a front wheel braking apparatus which imparts a braking force to the front wheels WFL and WFL.

The front steering apparatus 10 includes a steering control handle 11, a steering shaft 12 with one end connected to the steering control handle 11, a front wheel steering control shaft 13, and a front steering actuator 14. The steering shaft 12 rotates by a driver's rotational operation of the steering control handle 11.

A pinion gear 12a is formed at the other end of the steering shaft 12. Further, the front wheel steering control shaft 13 has a rack gear 13a formed therein so as to mesh with a pinion gear 12a. The pinion gear 12a and the rack gear 13a constitute a rack and pinion mechanism. The rack and pinion mechanism converts a rotational force of the steering shaft 12 to an axial force of the front wheel steering control shaft 13. Therefore, the rotational operation of the steering control handle 11 by the driver moves the front wheel steering control shaft 13 in the axial direction. Both ends of the front wheel steering control shaft 13 are connected to the left front wheel WFL and the right front wheel WFR through a tie rod. Accordingly, the driver performs the rotational operation of the steering control handle 11 and thereby the front wheel steering control shaft 13 moves in the axial direction, by which the front wheels turn.

Moreover, the front steering actuator 14 is attached to the steering shaft 12. The front steering actuator 14 consists of, for example, an electric motor. The front steering actuator 14 actuates to rotate the steering shaft 12. Therefore, the front wheels automatically turn by the actuation of the front steering actuator 14 without the driver's rotational operation of the steering control handle 11.

The rear steering apparatus 20 includes a rear wheel steering control shaft 21 and a rear steering actuator 22. The rear wheel steering control shaft 21 is connected to the left rear wheel WRL and to the right rear wheel WRR. The rear steering actuator 22 is attached to the rear wheel steering control shaft 21. The rear steering actuator 22 consists of, for example, an electric motor and a ball screw mechanism. The ball screw mechanism has a ball screw nut and a ball screw rod. The ball screw rod is formed in a part of the rear wheel steering control shaft 21. The ball screw nut is coupled to a rotor of the electric motor so as to be integrally rotatable. Upon the rotation of the ball screw nut in response to the rotation of the electric motor, the ball screw mechanism converts the rotational force to an axial force of the rear wheel steering control shaft 21. Therefore, the actuation of the rear steering actuator 22 moves the rear wheel steering control shaft 21 in the axial direction, by which the rear wheels automatically turn.

The rear wheel braking apparatuses 30R and 30L include brake mechanisms 31R and 31L for imparting a braking force to the rear wheels WRR and WRL, respectively. The brake mechanisms 31R and 31L are actuated in response to the driver's depression of a brake pedal. Each of the brake mechanisms 31R and 31L may include, for example, a disc rotor which rotates coaxially with a rear wheel WRR or WRL, a brake pad disposed so as to be contactable with a disc rotor, a piston for imparting a pressing force to the brake pad, and a hydraulic circuit for transmitting a brake pedal treading force increased by a brake booster, which is not shown, to the piston.

Moreover, dynamic yaw control (DYC) actuators 32R and 32L are attached to the brake mechanisms 31R and 31L, respectively. The DYC actuator imparts a braking force or a driving force to wheels individually. In this embodiment, the DYC actuator is a brake actuator capable of imparting a braking force to the wheels individually. The brake mechanisms 31R and 31L are operated by the actuation of the DYC actuators 32R and 32L to apply the braking force to the rear wheels WRR and WRL independently of each other. The DYC actuators 32R and 32L are actuated in response to a control signal from a lateral momentum control apparatus described later, without the depressing operation of the brake pedal. Therefore, the braking force is automatically imparted to the rear wheels WRR and WRL. The DYC actuators 32R and 32L may include, for example, a pressure pump, a pressurizing valve and a depressurizing valve interposed in the hydraulic circuit, and the like. Hereinafter, the DYC actuators 32R and 32L will be collectively or individually referred to as the DYC actuator 32.

Although the DYC actuator 32 imparts a braking force to the wheels individually in this embodiment, the DYC actuator 32 may impart a driving force or a regenerative braking force to the wheels individually. For example, in the case of a vehicle on which an in-wheel motor is mounted, the in-wheel motor may be the DYC actuator.

Each of the front steering actuator 14, the rear steering actuator 22, and the DYC actuator 32 are electrically connected to the lateral momentum control apparatus 40. The lateral momentum control apparatus 40 consists of a microcomputer including a ROM, a RAM, and a CPU. The lateral momentum control apparatus 40 controls the lateral momentum of the vehicle by outputting control signals to the respective actuators.

In addition, a driving assistance application 50 is installed on the vehicle. The driving assistance application 50 calculates a lateral acceleration (target lateral acceleration) Gy* required for the current moving vehicle so that the vehicle runs along a lane. The target lateral acceleration Gy* calculated by the driving assistance application 50 is inputted to the lateral momentum control apparatus 40. The lateral momentum control apparatus 40 outputs control signals to the actuators 14, 22, and 32 on the basis of the input target lateral acceleration Gy*.

Figure 2:
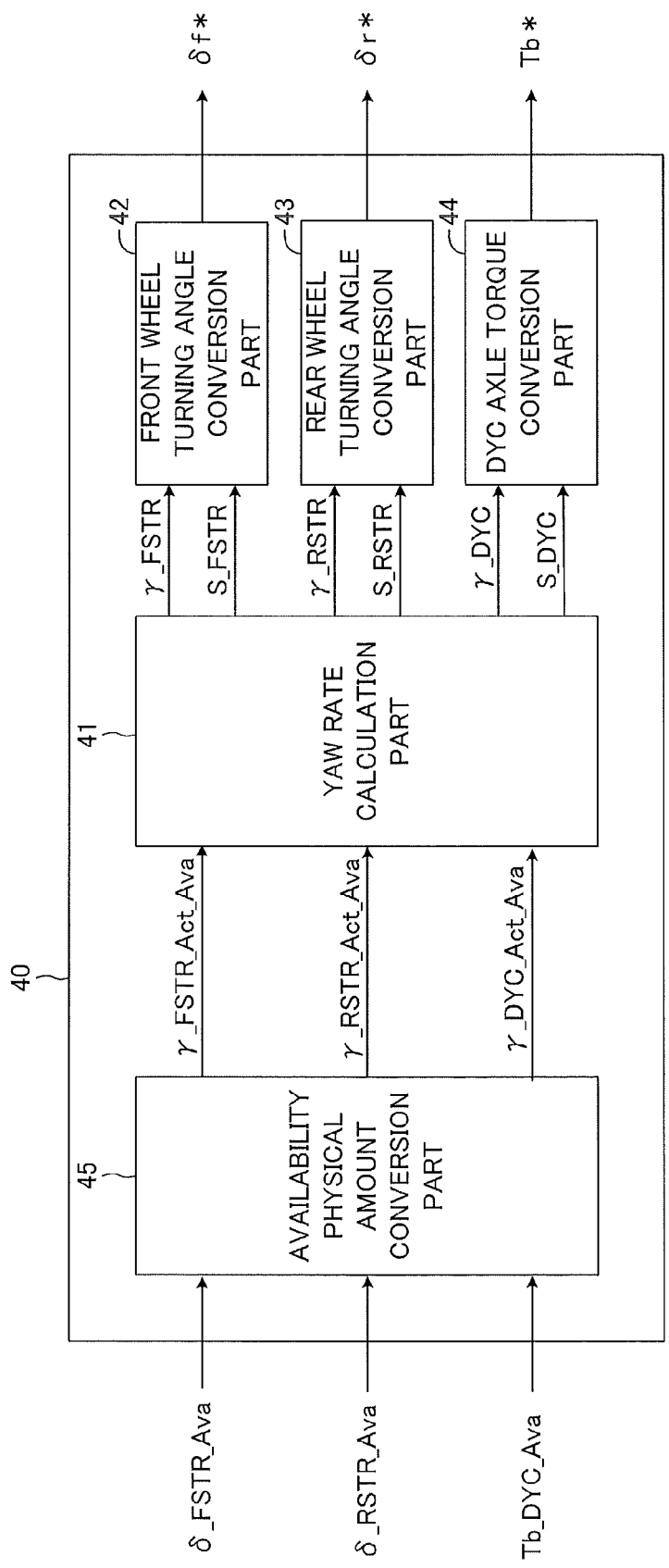
FIG. 2 is a diagram illustrating a functional configuration of the lateral momentum control apparatus.

FIG. 2 is a diagram illustrating a functional configuration of the lateral momentum control apparatus 40. As shown in FIG. 2, the lateral momentum control apparatus 40 includes an availability physical amount conversion unit 45, a yaw rate calculation unit 41, a front wheel turning angle conversion unit 42, a rear wheel turning angle conversion unit 43, and a DYC axle torque conversion unit 44.

The availability physical amount conversion unit 45 inputs a front steering availability turning angle $\delta\_{FSTR\_Ava}$, a rear steering availability turning angle $\delta\_{RSTR\_Ava}$, and a DYC availability torque $Tb\_{DYC\_Ava}$. The front steering availability turning angle $\delta\_{FSTR\_Ava}$ indicates a turning angular amount (or a range of turning angle) by which the front wheels can be turned from the current turning state (current turning angle) by the actuation of the front steering actuator 14. The rear steering availability turning angle $\delta\_{RSTR\_Ava}$ indicates a turning angular amount (or a range of turning angle) by which the rear wheels can be turned from the current turning state (current turning angle) by the actuation of the rear steering actuator 22. The DYC availability torque $Tb\_{DYC\_Ava}$ indicates an axle torque amount (or a range of axle torque) that can be applied to an axle controlled by the actuation of the DYC actuator 32.

The front steering availability turning angle $\delta\_{FSTR\_Ava}$ can be found on the basis of the current turning angle of the front wheels and the maximum turning angle of the front wheels. The rear steering availability turning angle $\delta\_{RSTR\_Ava}$ can be found on the basis of the current turning angle of the rear wheels and the maximum turning angle of the rear wheels. The DYC availability torque $Tb\_{DYC\_Ava}$ can be found on the basis of the axle brake torque currently acting on the wheels and the maximum value of axle torque applicable to the wheels.

Moreover, the availability physical amount conversion unit 45 calculates a front steering availability theoretical yaw rate $\gamma\_{FSTR\_Act\_Ava}$, a rear steering availability theoretical yaw rate $\gamma\_{RSTR\_Act\_Ava}$, and a DYC availability theoretical yaw rate $\gamma\_{DYC\_Act\_Ava}$ on the basis of the inputted front steering availability turning angle $\delta\_{FSTR\_Ava}$, the rear steering availability turning angle $\delta\_{RSTR\_Ava}$, and the DYC availability torque $Tb\_{DYC\_Ava}$. The availability theoretical yaw rates calculated by the availability physical amount conversion unit 45 are outputted to the yaw rate calculation unit 41. The front steering availability theoretical yaw rate $\gamma\_{FSTR\_Act\_Ava}$ indicates a maximum value (or range) for yaw rate that theoretically can be elicited when the turning angle of the front wheels changes within the turning angle range represented by the front steering availability turning angle $\delta\_{FSTR\_Ava}$. The rear steering availability theoretical yaw rate $\gamma\_{RSTR\_Act\_Ava}$ indicates the maximum value (or range) of yaw rate that theoretically can be elicited when the turning angle of the rear wheels changes within the turning angle range represented by the rear steering availability turning angle $\delta\_{RSTR\_Ava}$. The DYC availability theoretical yaw rate $\gamma\_{DYC\_Act\_Ava}$ indicates the maximum value (or range) of yaw rate that theoretically can be elicited when the axle torque acted on the wheels changes within the axle torque range represented by the DYC availability torque $Tb\_{DYC\_Ava}$.

The yaw rate calculation unit 41 inputs a target lateral acceleration Gy* from the driving assistance application 50, and calculates a front steering yaw rate control amount $\gamma\_{FSTR}$ (FSTR indicates the front steering actuator 14), a rear steering yaw rate control amount $\gamma\_{RSTR}$ (RSTR indicates the rear steering actuator 22), and a DYC yaw rate control amount $\gamma\_{DYC}$ (DYC indicates the DYC actuator 32) on the basis of the input target lateral acceleration Gy*. And then The yaw rate calculation unit 41 outputs these yaw rate control amounts. The front steering yaw rate control amount $\gamma\_{FSTR}$ is a target control amount of a yaw rate elicited in the vehicle by the actuation of the front steering actuator 14 to turn the front wheels. The rear steering yaw rate control amount $\gamma\_{RSTR}$ is a target control amount of a yaw rate elicited in the vehicle by the actuation of the rear steering actuator 22 to turn the rear wheels. The DYC yaw rate controlled amount $\gamma\_{DYC}$ is a target controlled amount of a yaw rate elicited in the vehicle by the actuation of the DYC actuator 32 to impart a braking force to the right rear wheel WRR or to the left rear wheel WRL.

Moreover, the yaw rate calculation unit 41 outputs a front steering actuation request signal $S\_{FSTR}$, a rear steering actuation request signal $S\_{RSTR}$, and a DYC actuation request signal $S\_{DYC}$. The front steering actuation request signal $S\_{FSTR}$ represents a signal for requesting the actuation of the front steering actuator 14 for yaw rate control. The rear steering actuation request signal $S\_{RSTR}$ represents a signal for requesting the actuation of the rear steering actuator 22 for yaw rate control. The DYC actuation request signal $S\_{DYC}$ represents a signal for requesting the actuation of the DYC actuator 32 for yaw rate control.

Figure 3:
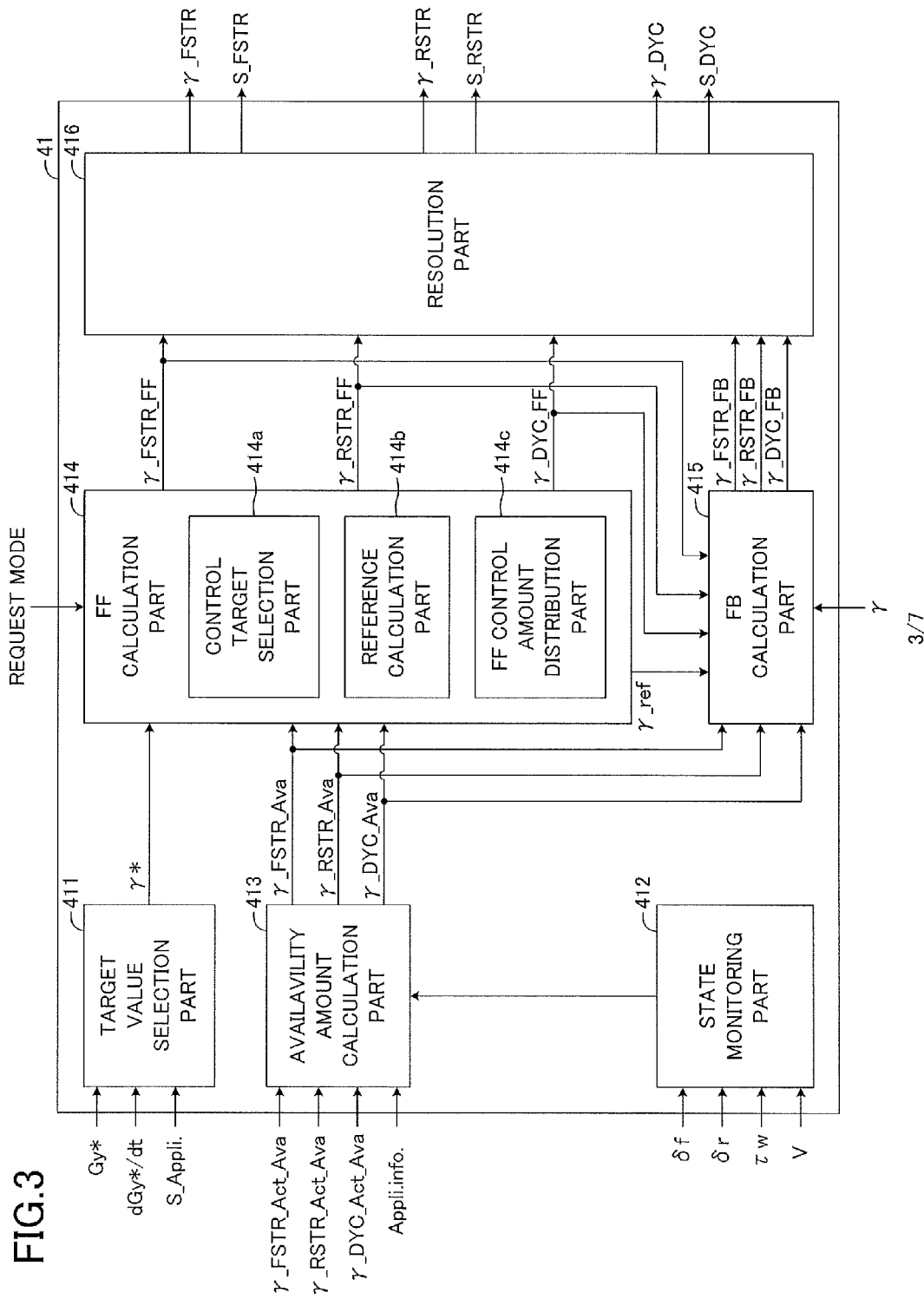
FIG. 3 is a diagram illustrating a functional configuration of a yaw rate calculation part.

FIG. 3 is a diagram illustrating a functional configuration of the yaw rate calculation part 41. As shown in FIG. 3, the yaw rate calculation part 41 includes a target value generation part 411, a state monitoring part 412, an availability amount calculation part 413, a feed-forward (FF) calculation part 414, a feedback (FB) calculation part 415, and a resolution part 416.

The target value generation part 411 inputs a target lateral acceleration Gy* from the driving assistance application 50 and calculates a target yaw rate $\gamma$* to be elicited in the vehicle on the basis of the inputted target lateral acceleration Gy*, so that the lateral acceleration acting on the vehicle becomes the target lateral acceleration Gy*. The target yaw rate $\gamma$* can be calculated, for example, by dividing the target lateral acceleration Gy* by a vehicle speed V and then subtracting a time derivative of a vehicle body slip angle $\beta$ (d$\beta$/dt) from the obtained value. Moreover, the target value generation part 411 inputs dGy*/dt (change amount of the target lateral acceleration Gy*) and an application execution request signal $S\_{Appli.}$ from the driving assistance application 50. The change amount of the target lateral acceleration dGy*/dt is used to calculate the target yaw rate $\gamma$*. The application execution request signal $S\_{Appli.}$ represents a signal for requesting a control of a yaw rate on the basis of the target lateral acceleration Gy* output from the driving assistance application 50.

The state monitoring part 412 inputs a front wheel turning angle $\delta$f from a front wheel turning angle sensor attached to the vehicle, a rear wheel turning angle $\delta$r from a rear wheel turning angle sensor, a wheel torque TW of each wheel from a torque sensor attached to each wheel, and a vehicle speed V from a vehicle speed sensor. Moreover, the state monitoring part 412 estimates the current state of the vehicle on the basis of the inputted information and outputs a physical limit amount elicited in the vehicle (for example, physical limited (maximum) yaw rate which can be elicited in the vehicle), which indicates the estimated state of the vehicle.

The availability amount calculation part 413 inputs the current state of the vehicle from the state monitoring part 412.

Moreover, the availability amount calculation part 413 inputs a front steering availability theoretical yaw rate $\gamma\_{FSTR\_Act\_Ava}$, a rear steering availability theoretical yaw rate $\gamma\_{RSTR\_Act\_Ava}$, and a DYC availability theoretical yaw rate $\gamma\_{DYC\_Act\_Ava}$. Further, the availability amount calculation part 413 inputs application information from the driving assistance application 50. The application information is, for example, information indicating whether or not the actuator is enabled or information representing characteristics of the yaw rate control.

Then, the availability amount calculation part 413 calculates a front steering availability yaw rate $\gamma\_{FSTR\_Ava}$, a rear steering availability yaw rate $\gamma\_{RSTR\_Ava}$, and a DYC availability yaw rate $\gamma\_{DYC\_Ava}$ on the basis of the aforementioned physical limit amount elicited in the vehicle representing the state of the vehicle, the front steering availability theoretical yaw rate $\gamma\_{FSTR\_Act\_Ava}$, the rear steering availability theoretical yaw rate $\gamma\_{RSTR\_Act\_Ava}$, the DYC availability theoretical yaw rate $\gamma\_{DYC\_Act\_Ava}$, and the application information.

The front steering availability yaw rate $\gamma\_{FSTR\_Ava}$ indicates a maximum value (or range) of yaw rate that can be actually elicited in the vehicle by the actuation of the front steering actuator 14, in the case where the physical limit amount elicited in the vehicle representing the state of the vehicle, and the application information are taken into consideration. The rear steering availability yaw rate $\gamma\_{RSTR\_Ava}$ indicates the maximum value (or range) of yaw rate that can be actually elicited in the vehicle by the actuation of the rear steering actuator 22, in the case where physical limit amount elicited in the vehicle and the application information are taken into consideration. The DYC availability yaw rate $\gamma\_{DYC\_Ava}$ indicates the maximum value (or range) of yaw rate that can be actually elicited in the vehicle by the actuation of the DYC actuator 32, in the case where the physical limit amount elicited in the vehicle and the application information are taken into consideration. In this case, the availability amount calculation part 413 stores a table representing the correspondence between the respective availability yaw rates and the physical limit amount elicited in the vehicle, the front steering availability theoretical yaw rate $\gamma\_{FSTR\_Act\_Ava}$, the rear steering availability theoretical yaw rate $\gamma\_{RSTR\_Act\_Ava}$, the DYC availability theoretical yaw rate $\gamma\_{DYC\_Act\_Ava}$, or the like. The availability amount calculation part 413 then calculates the respective availability yaw rates by referencing the above table on the basis of the respective input information.

Each availability yaw rate represents the maximum value (or range) of yaw rate that can be actually generated in the vehicle by the actuation of the respective actuators as described above. The availability yaw rate is calculated in consideration of not only the range of movement of each actuator but also the responsiveness of each actuator or the state of the vehicle inputted from the vehicle state monitoring part. For example, in the case that the range of movement of the actuator (a difference between the current position and a movable limited position of the actuator) is large, the yaw rate that can be elicited by the actuation of the actuator is high and therefore the availability yaw rate is high. In addition, the actuator having high responsiveness has a high rate of change ($d\gamma/dt$) in yaw rate and therefore has a high availability yaw rate. The availability amount calculation part 413 calculates the availability yaw rate with respect to each of the actuators as described above. Notably, the availability amount calculation part 413 may calculate the maximum value (or range) of change amount of the yaw rate ($d\gamma/dt$) that can be generated in the vehicle by the actuation of the respective actuators, in addition to the availability yaw rate.

The feed-forward (FF) calculation part 414 inputs the target yaw rate $\gamma^*$, the respective availability yaw rates (the front steering availability yaw rate $\gamma\_{FSTR\_Ava}$, the rear steering availability yaw rate $\gamma\_{RSTR\_Ava}$, and the DYC availability yaw rate $\gamma\_{DYC\_Ava}$), and a request mode. The request mode is inputted from the driving assistance application 50. The request mode represents a mode for controlling the yaw rate of the vehicle. For example, when the request mode is a responsiveness-oriented mode, the yaw rate is controlled so that the head of the vehicle is quickly turned. When the request mode is a driving amenity (smooth changing in yaw rates)-oriented mode in the case where a plurality of actuators are actuated relative to one another, the yaw rate is controlled so as to smoothly change. Moreover, the feed-forward calculation part 414 includes a controlled target selection part 414a, a reference calculation part 414b, and a feed-forward control amount distribution part 414c.

The control target selection part 414a determines a priority order for the actuators for use in the yaw rate control of the vehicle on the basis of the request mode and/or the availability information. For example, when the request mode is the responsiveness-oriented mode, the control target selection part 414a determines the priority order such that the DYC actuator 32 having the highest responsiveness has the first priority, the front steering actuator 14 has a second priority, and the rear steering actuator 22 has a third priority. When the request mode is a yaw rate level-oriented mode which the largeness of the yaw rate is oriented for determining the priority order, the control target selection part 414a determines the priority order such that an actuator having the highest availability yaw rate has a first priority, an actuator having the next highest availability yaw rate has a second priority, and an actuator having the lowest availability yaw rate has a third priority in order to minimize the number of actuators to be used.

The reference calculation part 414b inputs a target yaw rate $\gamma^*$ from the target value generation part 411 and calculates a feed-forward yaw rate reference amount $\gamma\_{ref}$ by executing a reference calculation on the target yaw rate $\gamma^*$. The feed-forward yaw rate reference amount $\gamma\_{ref}$ represents a yaw rate value calculated by simulating a delay in response of the vehicle when the vehicle turns. Moreover, the reference calculation part 414b outputs the calculated feed-forward yaw rate reference amount $\gamma\_{ref}$ to the feedback calculation part 415 for using a feedback calculation.

The feed-forward control amount distribution part 414c distributes a feed-forward yaw rate control amount $\gamma\_{FF}$ calculated on the basis of the feed-forward yaw rate reference amount $\gamma\_{ref}$ calculated by the reference calculation part 414b as a front steering feed-forward yaw rate control amount $\gamma\_{FSTR\_FF}$, a rear steering feed-forward yaw rate control amount $\gamma\_{RSTR\_FF}$, and a DYC feed-forward yaw rate control amount $\gamma\_{DYC\_FF}$. The front steering feed-forward yaw rate control amount $\gamma\_{FSTR\_FF}$ represents a feed-forward control amount of the yaw rate elicited in the vehicle by actuating the front steering actuator 14. The rear steering feed-forward yaw rate control amount $\gamma\_{RSTR\_FF}$ represents a feed-forward control amount of the yaw rate elicited in the vehicle by actuating the rear steering actuator 22. The DYC feed-forward yaw rate control amount $\gamma\_{DYC\_FF}$ represents a feed-forward control amount of the yaw rate elicited in the vehicle by actuating the DYC actuator 32.

In this case, the feed-forward control amount distribution part 414c distributes the feed-forward yaw rate control amount $\gamma\_{FF}$ on the basis of the priority order determined by the control target selection part 414a and the respective availability yaw rates. For example, in the case where the calculated feed-forward yaw rate control amount $\gamma\_{FF}$ is 10, the front steering actuator 14 has the first priority, the rear steering actuator 22 has the second priority, the DYC actuator 32 has the third priority, the front steering availability yaw rate $\gamma\_{FSTR\_Ava}$ is 6, the rear steering availability yaw rate $\gamma\_{RSTR\_Ava}$ is 3, and the DYC availability yaw rate $\gamma\_{DYC\_Ava}$ is 3, is considered. In the above case, the feed-forward control amount distribution part 414c distributes the feed-forward yaw rate control amount $\gamma\_{FF}$ such that, the front steering feed-forward yaw rate control amount $\gamma\_{FSTR\_FF}$ is 6, the rear steering feed-forward yaw rate control amount $\gamma\_{RSTR\_FF}$ is 3, and the DYC feed-forward yaw rate control amount $\gamma\_{DYC\_FF}$ is 1. The feed-forward control amount distribution part 414c then outputs the distributed feed-forward yaw rate control amounts to the feedback calculation part 415 and the resolution part 416.

The feedback calculation part 415 inputs the respective availability yaw rates (the front steering availability yaw rate $\gamma\_{FSTR\_Ava}$, the rear steering availability yaw rate $\gamma\_{RSTR\_Ava}$, and the DYC availability yaw rate $\gamma\_{DYC\_Ava}$) from the availability amount calculation part 413, the respective feed-forward yaw rate control amounts (the front steering feed-forward yaw rate control amount $\gamma\_{FSTR\_FF}$, the rear steering feed-forward yaw rate control amount $\gamma\_{RSTR\_FF}$, and the DYC feed-forward yaw rate control amount $\gamma\_{DYC\_FF}$) and the feed-forward yaw rate reference amount $\gamma\_{ref}$ from the feed-forward calculation part 414, and the yaw rate $\gamma$ of the vehicle from the yaw rate sensors attached to the vehicle body.

The feedback calculation part 415 selects actuators available for the yaw rate control of the vehicle on the basis of the allowance amount calculated from the respective availability yaw rates and the respective feed-forward yaw rate controlled amounts. In addition, the feedback calculation part 415 determines a priority order of available actuators.

Further, the feedback calculation part 415 feedback-controls the yaw rate elicited on the vehicle based on a deviation (difference) $\Delta\gamma$ ($=\gamma\_{ref}-\gamma$) between the inputted feed-forward yaw rate reference amount $\gamma\_{ref}$ and the yaw rate $\gamma$. For example, in the case that the feedback control is a PID control, the feedback calculation part 415 calculates the feedback yaw rate control amount $\gamma\_{FB}$ according to the following equation (1):

$$\gamma\_{FB} = K_p \cdot \Delta\gamma + K_i \cdot \int \Delta\gamma dt + K_d \cdot \frac{d\Delta\gamma}{dt} \quad (1)$$

In the above equation (1), $K_p$ is a proportional gain, $K_i$ is an integral gain, and $K_d$ is a derivative gain.

Moreover, the feedback calculation part 415 distributes the calculated feedback yaw rate control amount $\gamma\_{FB}$ as a front steering feedback yaw rate control amount $\gamma\_{FSTR\_FB}$, a rear steering feedback yaw rate control amount $\gamma\_{RSTR\_FB}$, and a DYC feedback yaw rate control amount $\gamma\_{DYC\_FB}$. The front steering feedback yaw rate control amount $\gamma\_{FSTR\_FB}$ represents an individual feedback control amount of the yaw rate generated on the vehicle by actuating the front steering actuator 14. The rear steering feedback yaw rate control amount $\gamma\_{RSTR\_FB}$ represents an individual feedback control amount of the yaw rate generated on the vehicle by actuating the rear steering actuator 22. The DYC feedback yaw rate control amount $\gamma\_{DYC\_FB}$ represents an individual feedback control amount of the yaw rate generated on the vehicle by actuating the DYC actuator 32.

The feedback calculation part 415 distributes the feedback yaw rate control amount $\gamma\_{FB}$ on the basis of the priority order of the actuators and the respective availability yaw rates (the front steering availability yaw rate $\gamma\_{FSTR\_Ava}$, the rear steering availability yaw rate $\gamma\_{RSTR\_Ava}$, and the DYC availability yaw rate $\gamma\_{DYC\_Ava}$) and then outputs the distributed feedback yaw rate control amounts (the front steering feedback yaw rate control amount $\gamma\_{FSTR\_FB}$, the rear steering feedback yaw rate control amount $\gamma\_{RSTR\_FB}$, and the DYC feedback yaw rate control amount $\gamma\_{DYC\_FB}$) to the resolution part 416.

The resolution part 416 calculates a front steering yaw rate control amount $\gamma\_{FSTR}$ by adding the front steering feed-forward yaw rate control amount $\gamma\_{FSTR\_FF}$ inputted from the feed-forward calculation part 414 with the front steering feedback yaw rate control amount $\gamma\_{FSTR\_FB}$ inputted from the feedback calculation part 415. Then, the resolution part 416 outputs the calculated front steering yaw rate control amount $\gamma\_{FSTR}$ and the front steering actuation request signal $S\_{FSTR}$ for requesting the actuation of the front steering actuator 14 to the wheel turning angle conversion part 42. Moreover, the resolution part 416 calculates a rear steering yaw rate control amount $\gamma\_{RSTR}$ by adding the rear steering feed-forward yaw rate control amount $\gamma\_{RSTR\_FF}$ inputted from the feed-forward calculation part 414 with the rear steering feedback yaw rate control amount $\gamma\_{RSTR\_FB}$ inputted from the feedback calculation part 415. The resolution part 416 then outputs the calculated rear steering yaw rate control amount $\gamma\_{RSTR}$ and the rear steering actuation request signal $S\_{FSTR}$ for requesting the actuation of the rear steering actuator 22 to the rear wheel turning angle conversion part 43. Further, the resolution part 416 calculates a DYC yaw rate control amount $\gamma\_{DYC}$ by adding the DYC feed-forward yaw rate control amount $\gamma\_{DYC\_FF}$ inputted from the feed-forward calculation part 414 with the DYC feedback yaw rate control amount $\gamma\_{DYC\_FB}$ inputted from the feedback calculation part 415. Thereafter, the resolution part 416 outputs the calculated DYC yaw rate control amount $\gamma\_{DYC}$ and the DYC actuation request signal $S\_{DYC}$ for requesting the actuation of the DYC actuator 32 to the DYC axle torque conversion part 44.

As shown in FIG. 2, the front wheel turning angle conversion part 42 inputs the front steering yaw rate control amount $\gamma\_{FSTR}$. The front wheel turning angle conversion part 42 calculates a target front wheel turning angle $\delta f^*$. The target front wheel turning angle $\delta f^*$ represents a turning angle of the front wheels necessary to elicit a yaw rate corresponding to the front steering yaw rate control amount $\gamma\_{FSTR}$ on the vehicle by actuating the front steering actuator 14. Then, the front wheel turning angle conversion part 42 outputs a signal representing the calculated target front wheel turning angle $\delta f^*$ to the front steering actuator 14. By the output signal, the actuation of the front steering actuator 14 is controlled such that the front wheel turning angle $\delta f$ becomes the target front wheel turning angle $\delta f^*$, in other words, such that a yaw rate corresponding to the front steering yaw rate control amount $\gamma\_{FSTR}$ is elicited on the vehicle through the actuation of the front steering actuator 14.

The rear wheel turning angle conversion part 43 inputs the rear steering yaw rate control amount $\gamma\_{RSTR}$. The rear wheel turning angle conversion part 43 calculates a target rear wheel turning angle $\delta r^*$. The target rear wheel turning angle $\delta r^*$ represents a turning angle of the rear wheels necessary to elicit a yaw rate corresponding to the rear steering yaw rate control amount $\gamma_{\_RSTR}$ on the vehicle by actuating the rear steering actuator 22. Then, the rear wheel turning angle conversion part 43 outputs a signal representing the calculated target rear wheel turning angle $\delta r^*$ to the rear steering actuator 22. By the output signal, the actuation of the rear steering actuator 22 is controlled such that the rear wheel turning angle $\delta r$ becomes the target rear wheel turning angle $\delta r^*$, in other words, such that a yaw rate corresponding to the rear steering yaw rate control amount $\gamma_{\_RSTR}$ is elicited on the vehicle through the actuation of the rear steering actuator 22.

The DYC axle torque conversion part 44 inputs the DYC yaw rate control amount $\gamma_{\_DYC}$. The DYC axle torque conversion part 44 calculates a target DYC torque Tb*. The target DYC torque Tb* represents a torque applied to one of the rear wheels necessary for generating a yaw rate corresponding to the DYC yaw rate control amount $\gamma_{\_DYC}$ on the vehicle by actuating the DYC actuator 32. Then the DYC axle torque conversion part 44 outputs a signal representing the calculated target DYC torque Tb* to the DYC actuator 32 for imparting a braking force to the rear wheel corresponding to the turning inside wheel out of the rear wheels WRR and WRL. By the output signal, the actuation of the DYC actuator 32 is controlled such that the axle torque Tb of the turning inside rear wheel becomes the target DYC torque Tb*, in other words, such that a yaw rate corresponding to the DYC yaw rate control amount $\gamma_{\_DYC}$ is elicited on the vehicle through the actuation of the DYC actuator 32.

As a result of the cooperative control of the plurality of actuators (the front steering actuator 14, the rear steering actuator 22, and the DYC actuator 32) as mentioned above, the yaw rate (momentum) of the vehicle is controlled so that the target lateral acceleration Gy* inputted from the driving assistance application 50 is generated in the vehicle.

Figure 4:
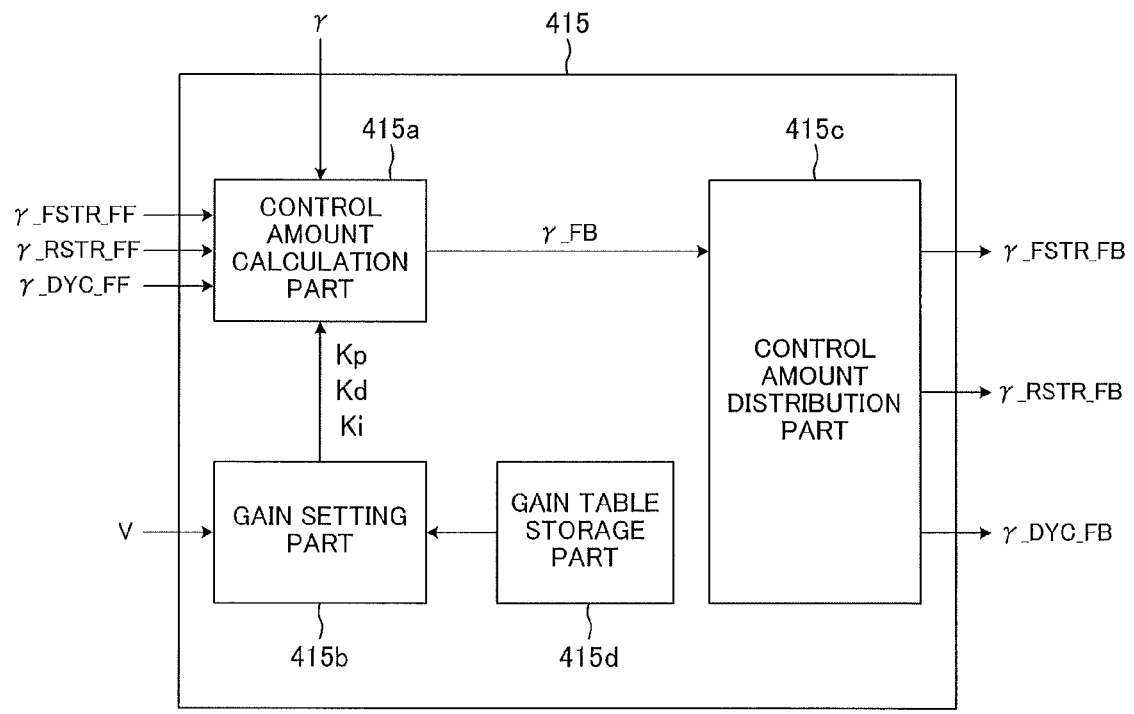
FIG. 4 is a diagram illustrating a functional configuration of a feedback calculation part.

As described above, the feedback calculation part 415 calculates the feedback yaw rate control amount $\gamma_{\_FB}$ according to the above equation (1) on the basis of the deviation $\Delta\gamma$ between the feed-forward yaw rate reference amount $\gamma_{\_ref}$ and the yaw rate $\gamma$. FIG. 4 is a diagram illustrating a functional configuration of the feedback calculation part 415. As shown in FIG. 4, the feedback calculation part 415 includes a controlled amount calculation part 415a, a gain setting part 415b, a control amount distribution part 415c, and a gain table storage part 415d.

The control amount calculation part 415a calculates the feedback yaw rate control amount $\gamma_{\_FB}$ such that the deviation $\Delta\gamma$ between the feed-forward yaw rate reference amount $\gamma_{\_ref}$ and the yaw rate $\gamma$ is smaller (become to zero) according to the equation (1). And then, the control amount calculation part 415a outputs the calculated feedback yaw rate control amount $\gamma_{\_FB}$ to the control amount distribution part 415c. In the control amount distribution part 415c, the feedback yaw rate control amount $\gamma_{\_FB}$ is distributed as the control amounts ($\gamma_{\_FSTR\_FB}$, $\gamma_{\_RSTR\_FB}$, $\gamma_{\_DYC\_FB}$) which are generated by the actuation of the respective actuators, on the basis of the priority order for the actuators. The gain setting part 415b sets a proportional gain $K_p$, an integral gain $K_i$, and a derivative gain $K_d$ for calculation of the feedback yaw rate control amount $\gamma_{\_FB}$ calculated in the control amount calculation part 415a, and outputs these set gains to the control amount calculation part 415a. The gain table storage part 415d stores a gain table in which the optimal feedback gains used when one of the actuators 14, 22, and 32 is independently actuated for feedback control are collected.

Figure 5:
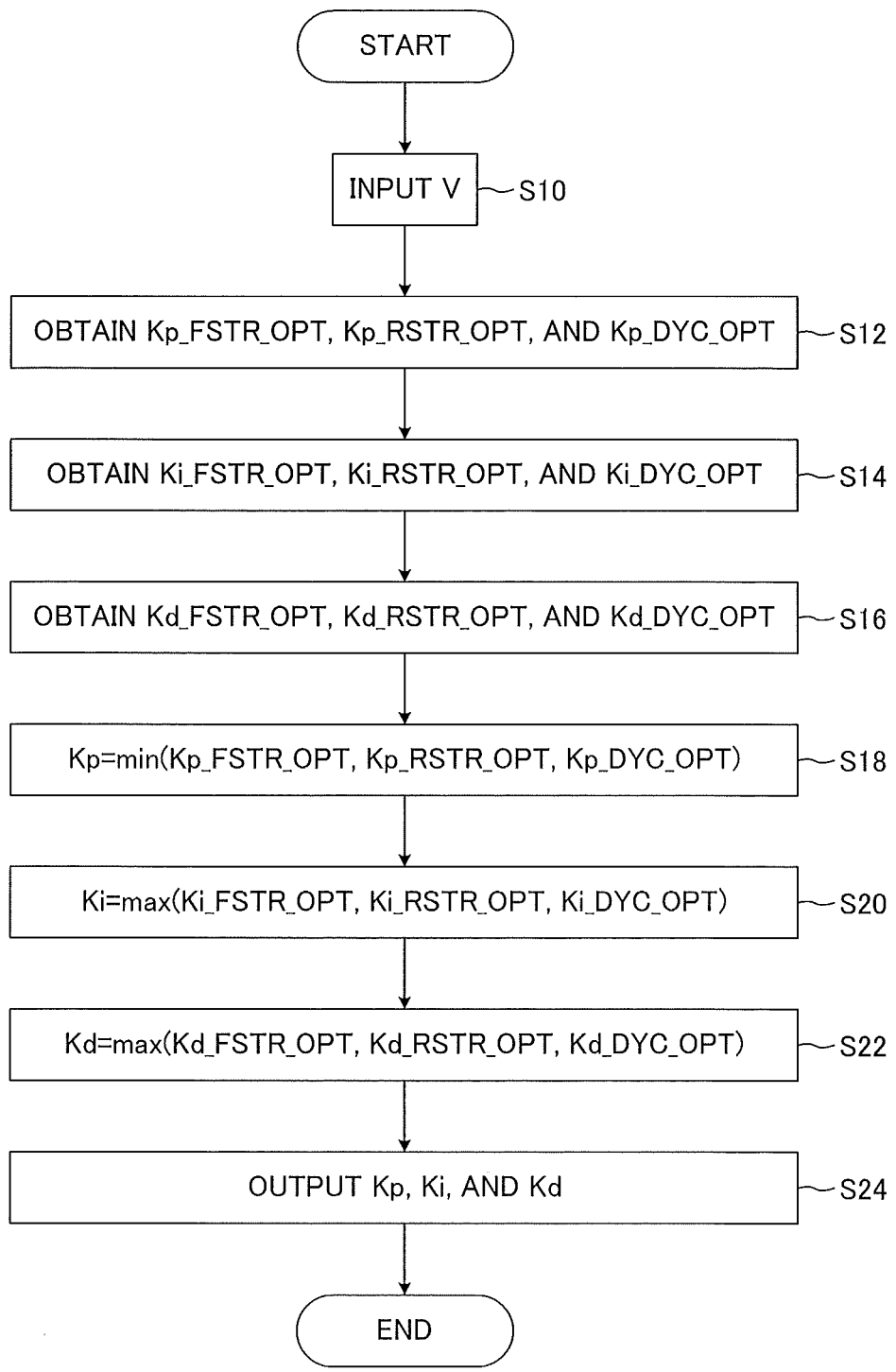
FIG. 5 is a flowchart representing a gain setting routine executed by a gain setting part for setting a feedback gain.

FIG. 5 is a flowchart representing a gain setting routine executed by the gain setting part 415b to set the gain. This routine is executed repeatedly, as required. Upon the start of this routine, the gain setting unit 415b, first, inputs a vehicle speed V from the vehicle speed sensor which is attached to the vehicle, in step (hereinafter, step is abbreviated as S) 10 in FIG. 5.

Subsequently, the gain setting part 415b obtains a front steering optimal proportional gain $K_{p\_FSTR\_OPT}$, a rear steering optimal proportional gain $K_{p\_RSTR\_OPT}$, and a DYC optimal proportional gain $K_{p\_DYC\_OPT}$, which change according to the vehicle speed V, on the basis of the vehicle speed V input in S10 (S12). The front steering optimal proportional gain $K_{p\_FSTR\_OPT}$ is an optimal proportional gain which should be used for the calculation of the feedback yaw rate control amount $\gamma_{\_FB}$, in the case where the yaw rate of the vehicle is feedback-controlled by independently actuation (operation) of the front steering actuator 14 by using the above equation (1). The rear steering optimal proportional gain $K_{p\_RSTR\_OPT}$ is an optimal proportional gain which should be used for the calculation of the feedback yaw rate control amount $\gamma_{\_FB}$, in the case where the yaw rate of the vehicle is feedback-controlled by independently actuation (operation) of the rear steering actuator 22 by using the above equation (1). The DYC optimal proportional gain $K_{p\_DYC\_OPT}$ is an optimal proportional gain which should be used for the calculation of the feedback yaw rate control amount $\gamma_{\_FB}$, in the case where the yaw rate of the vehicle is feedback-controlled by independently actuation (operation) of the DYC actuator 32 by using the above equation (1). In this embodiment, the gain setting part 415b refers to a vehicle speed-optimal proportional gain table, which stores in the gain table storage part 415d, to obtain the optimal proportional gains $K_{p\_FSTR\_OPT}$, $K_{p\_RSTR\_OPT}$, and $K_{p\_DYC\_OPT}$.

FIG. 6 is a diagram illustrating an example of the vehicle speed-optimal proportional gain table. As shown in FIG. 6, the front steering optimal proportional gain $K_{p\_FSTR\_OPT}$, the rear steering optimal proportional gain $K_{p\_RSTR\_OPT}$, and the DYC optimal proportional gain $K_{p\_DYC\_OPT}$ change according to a vehicle speed, which represents the motion state of the vehicle. For example, the front steering optimal proportional gain $K_{p\_FSTR\_OPT}$ is smaller as the vehicle speed is higher. The respective optimal proportional gains which change according to the vehicle speed V are previously researched for each vehicle speed with respect to each of actuators. On the basis of the result of the research, a vehicle speed-optimal proportional gain table, which represents the relation between the vehicle speed and the optimal proportional gains, as shown in FIG. 6 is created. According to the vehicle speed-optimal proportional gain table, for example, in the case the vehicle speed V is V3, the front steering optimal proportional gain $K_{p\_FSTR\_OPT}$ is $K3_{p\_FSTR}$, the rear steering optimal proportional gain $K_{p\_RSTR\_OPT}$ is $K3_{p\_RSTR}$, and the DYC optimal proportional gain $K_{p\_DYC\_OPT}$ is $K3_{p\_DYC}$. The gain setting part 415b extracts a gain corresponding to the input vehicle speed V from the vehicle speed-optimal proportional gain table to obtain the respective optimal proportional gains $K_{p\_FSTR\_OPT}$, $K_{p\_RSTR\_OPT}$, and $K_{p\_DYC\_OPT}$.

After obtaining the optimal proportional gains $K_{p\_FSTR\_OPT}$, $K_{p\_RSTR\_OPT}$, and $K_{p\_DYC\_OPT}$, the gain setting part 415b obtains a front steering optimal integral gain $K_{i\_FSTR\_OPT}$, a rear steering optimal integral gain $K_{i\_RSTR\_OPT}$, and a DYC optimal integral gain $K_{i\_DYC\_OPT}$ (S14). Subsequently, the gain setting part 415 obtains a front steering optimal derivative gain $K_{d\_FSTR\_OPT}$, a rear steering optimal derivative gain $K_{d\_RSTR\_OPT}$, and a DYC optimal derivative gain $K_{d\_DYC\_OPT}$ (S16). To obtain these optimal integral gains and optimal derivative gains, the gain setting part 415b refers to a $K_p$-$K_i$-$K_d$ correspondence gain table stored in the gain table storage part 415d.

FIG. 7 is a diagram illustrating an example of the $K_p$-$K_i$-$K_d$ correspondence gain table. As shown in FIG. 7, the optimal integral gain $K_{i\_*\_OPT}$ and the optimal derivative gain $K_{d\_*\_OPT}$ (* is one of FSTR [front steering], RSTR [rear steering], and DYC) for each actuator are determined on the basis of the optimal proportional gain $K_{p\_*\_OPT}$ for each actuator. A correspondence relation between the optimal integral gain $K_{i\_*\_OPT}$ and the optimal derivative gain $K_{d\_*\_OPT}$, and optimal proportional gain $K_{p\_*\_OPT}$ is previously researched, and then the correspondence gain table in FIG. 7 is created on the basis of the result of the research. According to the $K_p$-$K_i$-$K_d$ correspondence gain table, for example, in the case that the front steering optimal proportional gain $K_{p\_FSTR\_OPT}$ is $K3_{p\_FSTR}$, the front steering optimal integral gain $K_{i\_FSTR\_OPT}$ is $K3_{i\_FSTR}$ and the front steering optimal derivative gain $K_{d\_FSTR\_OPT}$ is $K3_{d\_FSTR}$. Moreover, in the case that the rear steering optimal proportional gain $K_{p\_RSTR\_OPT}$ is $K2_{p\_RSTR}$, the rear steering optimal integral gain $K_{i\_RSTR\_OPT}$ is $K2_{i\_RSTR}$ and the rear steering optimal derivative gain $K_{d\_RSTR\_OPT}$ is $K2_{d\_RSTR}$. Further, in the case that the DYC optimal proportional gain $K_{p\_DYC\_OPT}$ is $K4_{p\_DYC}$, the DYC optimal integral gain $K_{i\_DYC\_OPT}$ is $K4_{i\_DYC}$ and the DYC optimal derivative gain $K_{d\_DYC\_OPT}$ is $K4_{d\_DYC}$. The gain setting part 415b obtains each optimal integral gain $K_{i\_*\_OPT}$ and each optimal derivative gain $K_{d\_*\_OPT}$ corresponding to each optimal proportional gain $K_{p\_*\_OPT}$ from the $K_p$-$K_i$-$K_d$ correspondence gain table.

After obtaining the respective optimal integral gains $K_{i\_FSTR\_OPT}$, $K_{i\_RSTR\_OPT}$, and $K_{i\_DYC\_OPT}$ and the respective optimal derivative gains $K_{d\_FSTR\_OPT}$, $K_{d\_RSTR\_OPT}$, and $K_{d\_DYC\_OPT}$, the gain setting part 415b extracts the minimum gain out of the front steering optimal proportional gain $K_{p\_FSTR\_OPT}$, the rear steering optimal proportional gain $K_{p\_RSTR\_OPT}$, and the DYC optimal proportional gain $K_{p\_DYC\_OPT}$ obtained in S12 and sets the extracted gain to the proportional gain $K_p$ as the proportional gain of entire control system (S18). Subsequently, the gain setting part 415b extracts the maximum gain out of the front steering optimal integral gain $K_{i\_FSTR\_OPT}$, the rear steering optimal integral gain $K_{i\_RSTR\_OPT}$, and the DYC optimal integral gain $K_{i\_DYC\_OPT}$ obtained in S14 and sets the extracted gain to the integral gain $K_i$ as the integral gain of entire control system (S20). Further, the gain setting part 415b extracts the maximum gain out of the front steering optimal derivative gain $K_{d\_FSTR\_OPT}$, the rear steering optimal derivative gain $K_{d\_RSTR\_OPT}$, and the DYC optimal derivative gain $K_{d\_DYC\_OPT}$ obtained in S16 and sets the extracted gain to the derivative gain $K_d$ as the derivative gain of entire control system (S22). Then, the gain setting part 415b outputs the set proportional gain $K_p$, derivative gain $K_d$, and integral gain $K_i$ to the control amount calculation part 415a (S24). Thereafter, this routine ends.

As described above, in this embodiment, the minimum gain is extracted out of the optimal proportional gains obtained for each actuator and the extracted gain is set to the proportional gain for a control system. For example is as follows. The case that, the front steering optimal proportional gain $K_{p\_FSTR\_OPT}$ is 1.5 when a yaw rate is feedback-controlled by independently actuation (operation) of the front steering actuator 14, the rear steering optimal proportional gain $K_{p\_RSTR\_OPT}$ is 2.0 when a yaw rate is feedback-controlled by independently actuation (operation) of the rear steering actuator 22, and the DYC optimal proportional gain $K_{p\_DYC\_OPT}$ is 2.5 when a yaw rate is feedback-controlled by independently actuation (operation) of the DYC actuator 32, is considered. In that case, the front steering optimal proportional gain $K_{p\_FSTR\_OPT}$ (1.5) is set as the proportional gain $K_p$ of the control system. The yaw rate of the vehicle is feedback-controlled on the basis of the proportional gain $K_p$ of the control system set as described above.

In general, when the feedback gain of the control system is set and the PID control (or the PI control or the PD control) is performed on the basis of the feedback gain to feedback-control an controlled object by the actuations of a plurality of actuators, and when the set gain of the control system is greater than the optimal gain for one actuator, the control amount for the actuator overshoots. Particularly, the proportional gain $K_p$ greatly affects the responsiveness of the control amount, and therefore, the control amount overshoots when the proportional gain is greater than the optimal proportional gain. This causes hunting of the actuation behavior of the actuator and destabilizes the control of the control system. Particularly, in the case where the plurality of actuators cooperatively perform the PID control (or the PI control or the PD control) on the yaw rate of the vehicle, the overshoot destabilizes the behavior of the vehicle. To cope with this problem, in this embodiment, the minimum gain of the optimal proportional gains for the actuators is set to the proportional gain of the control system and thus no actuator overshoot. Therefore, stable feedback control is achieved.

Moreover, in this embodiment, the maximum gain of the optimal integral gains for the actuators is set to the integral gain of the control system and the maximum gain of the optimal derivative gains for the actuators is set to the derivative gain of the control system, respectively. This enables an increase in the control responsiveness without deteriorating the control stability. In this case, since the proportional gain of the control system is set to the minimum gain of the optimal proportional gains for the actuators, the overshoot of the control amount is small or the overshoot does not generate even if the integral gain and the derivative gain of the control system are large value.

In the above embodiment, the vehicle speed-optimal proportional gain table shown in FIG. 6 is referenced to obtain the optimal proportional gains for the actuators. In place of the vehicle speed-optimal proportional gain table, a disturbance-optimal proportional gain table may be referenced. The disturbance-optimal proportional gain table stores optimal proportional gains which change according to a disturbance acting on the control system. FIG. 8 shows an example of the disturbance-optimal proportional gain table. The disturbance-optimal proportional gain table is stored in the gain table storage part 415d. In FIG. 8, the disturbance is represented by w. The disturbance w affects the feedback control. A side wind acting on the vehicle, or a road surface shape on which the vehicle is running (the presence or absence of wheel tracks or the like) is an example of the disturbance w.

The optimal proportional gains for the actuators change according to the magnitude of the disturbance w. The optimal proportional gains, which change according to the disturbance w, are previously researched for each magnitude of the disturbance w, with respect to each of the actuators, and then the disturbance-optimal proportional gain table, which represents the correspondence relation between the disturbance and the optimal proportional gains as shown in FIG. 8, is created on the basis of the research. According to the disturbance-optimal proportional gain table, for example, when the magnitude of the disturbance w is w3, the front steering optimal proportional gain $K_{p\_FSTR\_OPT}$ is $K3_{p\_FSTR}$, the rear steering optimal proportional gain $K_{p\_RSTR\_OPT}$ is $K3_{p\_RSTR}$, and the DYC optimal proportional gain $K_{p\_DYC\_OPT}$ is $K3_{p\_DYC}$. The gain setting part 415b obtains the optimal proportional gains $K_{p\_FSTR\_OPT}$, $K_{p\_RSTR\_OPT}$, and $K_{p\_DYC\_OPT}$ by extracting from the disturbance-optimal proportional gain table. Then, the minimum gain of the obtained optimal proportional gains is set to the proportional gain of the control system. The yaw rate of the vehicle is feedback-controlled on the basis of the set proportional gain. Notably, the magnitude of the disturbance w can be obtained from, for example, a sensor for detecting the magnitude of the disturbance (for example, a side wind) acting on the controlled object (vehicle). In this case, the gain setting part 415b inputs the disturbance w from the disturbance detection sensor attached to the vehicle in S10 of the gain setting routine shown in FIG. 5.

The vehicle speed-optimal proportional gain table and the disturbance-optimal proportional gain table may be both used for obtaining the optimal proportional gains for the actuators. For example, the disturbance-optimal proportional gain table is referenced in the case where a great disturbance acts on the controlled object (vehicle) or where the driving assistance application 50 outputs a control command for suppressing a disturbance to the lateral momentum control apparatus 40, and in other cases, the vehicle speed-optimal proportional gain table is referenced. The proper use of the optimal proportional gain tables improves the kinetic performance of the vehicle.

Moreover, to obtain the optimal proportional gains, a target value achievement rate-optimal proportional gain table may be referenced in place of the vehicle speed-optimal proportional gain table shown in FIG. 6. FIG. 9 shows an example of the target value achievement rate-optimal proportional gain table. The target value achievement rate-optimal proportional gain table is stored in the gain table storage part 415d.

The target value achievement rate-optimal proportional gain table shown in FIG. 9 represents a relation between the achievement rate of the target value X(%) and the optimal proportional gain for each actuator. The achievement rate of the target value X is expressed in a percentage (($\gamma_{\_*\_act}$/$\gamma_{\_*}$)×100) of an estimated value $\gamma_{\_*\_act}$ of the yaw rate actually generated on the vehicle by the actuation of the actuator to the yaw rate control amount $\gamma_{\_*}$ (* is one of FSTR [front steering], RSTR [rear steering], and DYC) of each actuator. The estimated value $\gamma_{FSTR\_act}$ of the yaw rate generated on the vehicle by the actuation of the front steering actuator 14 can be estimated from, for example, a front wheel turning angle δf, which is detected by the front wheel turning angle sensor, and a front wheel turning angle speed dδf/dt, which is detected by the front wheel turning angle speed sensor. The estimated value $\gamma_{\_RSTR\_act}$ of the yaw rate generated in the vehicle by the actuation of the rear steering actuator 22 can be estimated from, for example, a rear wheel turning angle δr, which is detected by the rear wheel turning angle sensor, and a rear wheel turning angle speed dδr/dt, which is detected by the rear wheel turning angle speed sensor. The estimated value $\gamma_{\_DYC\_act}$ of the yaw rate generated in the vehicle by the actuation of the DYC actuator 32 can be estimated from, for example, an axle torque Tb, which is detected by the DYC axle torque sensor. The gain setting part 415b inputs signals from the above respective sensors in S10 of the gain setting routine shown in FIG. 5. Then the gain setting part 415b calculates each estimated value $\gamma_{\_*\_act}$ and the achievement rate of the target value X on each actuator on the basis of the input signals.

The optimal proportional gain of each actuator changes according to the achievement rate of the target value X, which represents the actuation state of each actuator. Each optimal proportional gain, which changes according to the achievement rate of the target value X, is previously researched for each level of the achievement rate of the target value X with respect to each of actuators. Then, on the basis of the result of the research, the target value achievement rate-optimal proportional gain table, which represents the correspondence relation between the achievement rate of the target value and the optimal proportional gains as shown in FIG. 9, is created. The gain setting part 415b obtains each optimal proportional gain with reference to the target value achievement rate-optimal proportional gain table in S12. For example, when the achievement rate of the target value X is 97% with respect to the front steering actuator 14, the front steering optimal proportional gain $K_{p\_FSTR\_OPT}$ is $K97_{\_FSTR}$. When the achievement rate of the target value X is 98% with respect to the rear steering actuator 22, the rear steering optimal proportional gain $K_{p\_RSTR\_OPT}$ is $K98_{\_RSTR}$. When the achievement rate of the target value X is 99% with respect to the DYC actuator 32, the DYC optimal proportional gain $K_{p\_DYC\_OPT}$ is $K99_{\_DYC}$. The minimum gain of the optimal proportional gains obtained by the gain setting part 415b is set to the proportional gain of the control system, and the yaw rate of the vehicle are feedback-controlled on the basis of the set proportional gain.

Moreover, to obtain the optimal proportional gains, a deviation-optimal proportional gain table may be referenced in place of the target value achievement rate-optimal proportional gain table. The deviation-optimal proportional gain table represents a relationship between a deviation between the yaw rate control amount $\gamma_{\_*}$ of each actuator and an estimated value $\gamma_{\_*\_act}$ of the yaw rate generated on the vehicle by the actuation of each actuator and the optimal proportional gain.

Further, the optimal integral gain and the optimal derivative gain may be determined on the basis of the responsiveness of each actuator. In this case, the gain setting part 415b previously stores dead time $L_{\_FSTR}$, a time constant $T_{\_FSTR}$, dead time $L_{\_RSTR}$, a time constant $T_{\_RSTR}$, dead time $L_{\_DYC}$, and a time constant $T_{\_DYC}$. Dead time $L_{\_FSTR}$ and a time constant $T_{\_FSTR}$ represent the transient response characteristics of the yaw rate when feedback-controlling the yaw rate of the vehicle by actuating the front steering actuator 14. Dead time $L_{\_RSTR}$ and a time constant $T_{\_RSTR}$ represent the transient response characteristics of the yaw rate when controlling the yaw rate of the vehicle by actuating the rear steering actuator 22. Dead time $L_{\_DYC}$ and a time constant $T_{\_DYC}$ represent the transient response characteristics of the yaw rate when controlling the yaw rate of the vehicle by actuating the DYC actuator 32. Meanwhile, the optimal proportional gain of each actuator is obtained in one of the above methods.

The integral time and the derivative time can be calculated from the optimal proportional gain, the dead time, and the time constant. The integral gain can be found from the proportional gain and the integral time. The derivative gain can be found from the proportional gain and the derivative time. The gain setting part 415b sets the maximum gain of the optimal integral gains of the actuators obtained as described above to the integral gain of the control system, and sets the maximum gain of the optimal derivative gains of the actuators to the derivative gain of the control system. The gain setting part 415b then outputs the proportional gain, the integral gain, and the derivative gain of the control system, which have been set, to the control amount calculation part 415a. The control amount calculation part 415a feedback-controls the yaw rate of the vehicle by using the proportional gain, the integral gain, and the derivative gain, which have been input.

As described above, according to the aspect of this disclosure, a momentum control apparatus (40) for feedback-controlling the momentum of a controlled object by using a plurality of actuators (14, 22, 32) includes, a target momentum obtaining part (411 or 415a) for obtaining a target momentum ($\gamma^*$ or $\gamma\_{ref}$) of the controlled object, an optimal feedback gain obtaining part (S12) for obtaining a plurality of optimal feedback gains used when each of the plurality of actuators is independently actuated to feedback-control the momentum of the controlled object, with respect to each of actuators, a feedback gain setting part (S18) for extracting a minimum feedback gain out of the plurality of optimal feedback gains obtained by the optimal feedback gain obtaining part, and for setting the minimum feedback gain as a feedback gain of a control system; a control amount calculation part (415a) for calculating a feedback control amount on the basis of the feedback gain set by the feedback gain setting part and a deviation between the target momentum and the current momentum ($\gamma$) of the controlled object, and an actuator control part (42, 43, 44) for controlling the actuation of the plurality of actuators on the basis of the feedback control amount.

According to the momentum control apparatus of this disclosure, a plurality of optimal feedback gains used when each of the plurality of actuators is independently actuated to feedback-control the momentum of the controlled object are obtained with respect to each of actuators by the optimal feedback gain obtaining part. Then, from the optimal feedback gains obtained by the optimal feedback gain obtaining part, which are used in each case of performing a feedback control by independently actuating each of the plurality of actuators, the minimum gain is extracted. Extracted minimum gain is set to the feedback gain of the control system. The feedback gain of the control system set in this manner is used to perform the feedback control. Therefore, no overshoot occurs in the control amount obtained by the actuation of any actuator. As a result, the motion state of the controlled object is stabilized.

The momentum control apparatus of this disclosure includes a feedback control amount distribution part (415c) for distributing a feedback control amount calculated by the control amount calculation part (415a) as individual feedback control amount which are control amount for respective actuators. The actuator control part (42, 43, 44) controls the actuation of the plurality of actuators on the basis of the individual feedback control amount distributed by the feedback control amount distribution part (415c).

The momentum control apparatus further includes an availability amount calculation part (413) for calculating an availability amount. The availability amount represents a range of the momentum of the controlled object generated by independently actuating the respective actuators. The availability amount is obtained for each of the actuators. The feedback control amount distribution part (415c) distributes the feedback control amount calculated by the control amount calculation part (415a) as the individual feedback control amount on the basis of the availability amount of each of the actuators calculated by the availability amount calculation part.

The availability amount calculated by the availability amount calculation part represents the momentum, which is able to be generated in the controlled object by independently actuating each actuator. By distributing the feedback control amount as individual feedback control amount on the basis of the availability amount of each actuator, properly distribution of the feedback control amount as individual feedback control amount can be achieved. Further, the feedback control amount is distributed in this manner, thereby preventing the control from being stopped by one actuator reaching the limit of movement.

The availability amount represents a range of the momentum of the controlled object generated by independently actuating each of the actuators as described above. For example, when the momentum of the controlled object is a yaw rate of the vehicle, the availability amount is represented by the maximum value of yaw rate or yaw rate variation (range) that can be generated by independently actuating the respective actuators.

The availability amount may be found on the basis of the motion state of the controlled object, a disturbance, the actuation states of the plurality of actuators, response characteristics, and the like. For example, when the yaw rate of the vehicle are feedback-controlled, the availability amount may be found on the basis of the current turning state of the vehicle (a front wheel turning angle, a rear wheel turning angle, a front wheel turning angle speed, a rear wheel turning angle speed, a vehicle speed, a braking torque, etc.), a disturbance (the strength of a side wind acting on the vehicle, a road surface shape [the presence or absence of wheel tracks and so forth], etc.), the actuation amount and actuation speed of the actuators, the responsiveness in controlling the yaw rate by the actuation of the actuators (dead time, time constant, etc.), and the information input from the driving assistance application.

The optimal feedback gain obtaining part (S12) obtains the optimal feedback gains which change according to the motion state of the controlled object, a disturbance, and the actuation states of the plurality of actuators, with respect to each case where each of the plurality of actuators is independently actuated. Furthermore, the momentum control apparatus further includes a gain table storage part (415d) for previously storing a gain table representing a relation between at least one of the motion state of the controlled object, the disturbance, and the actuation states of the plurality of actuators, and the optimal feedback gains of the plurality of actuators. Further, the optimal feedback gain obtaining part (S12) obtains the optimal feedback gain on the basis of at least one of the motion state of the controlled object, the disturbance, and the actuation states of the plurality of actuators by referencing the gain table stored in the gain table storage part. According thereto, a proper feedback gain can be set according to the motion state of the controlled object, the disturbance generation state, the actuation states of the actuators, or the like.

The controlled object may be a moving vehicle, and the momentum may be a yaw rate of the vehicle. According thereto, the feedback control of the yaw rate of the vehicle stabilizes the turning behavior of the vehicle.

The plurality of actuators may include a front steering actuator (14) actuated to turn the front wheels of the vehicle, a rear steering actuator (22) actuated to turn the rear wheels of the vehicle, and a DYC actuator (32) actuated to impart a braking force or a driving force to the wheels. According thereto, the coordination of the plurality of actuators including the front steering actuator, the rear steering actuator, and the DYC actuator enables the yaw rates of the vehicle to be integrally controlled.

While preferred embodiments of the present invention have been described herein in detail, it is understood that the present invention should not be limited to those embodiments. In the above embodiment, an example of feedback-controlling the yaw rate of the vehicle by the PID control has been described. However, the PI control, the PD control, or a state feedback control may be used in place of the PID control. Further, when number of the gain necessary for controlling is only one, the minimum gain of the optimal gains of the actuators is set to the gain. Moreover, in the above embodiment, the minimum gain of the optimal proportional gains of the actuators is set to the proportional gain of the control system in the case of feedback-controlling the yaw rate of the vehicle by the PID control, and the maximum gain of the optimal gains of the actuators is set to the gain of the control system with respect to other gains (the integral gain and the derivative gain). However, the minimum gain of the optimal gains may be set to each gain (the proportional gain, the integral gain, or the derivative gain) of the control system. Further, in the above embodiment, there has been described an example of feedback-controlling the yaw rate of the vehicle by using the plurality of actuators. However, the present invention is applicable as long as the momentum of the controlled object is feedback-controlled by using a plurality of actuators. Moreover, a plurality of optimal proportional gain table may be stored in the gain table storage unit 415*d*. And then, the gain setting unit 415*b* may obtain a plurality of optimal proportional gains with reference to a plurality of optimal proportional gain tables with respect to each actuator. In this case, the minimum gain of the plurality of optimal proportional gains obtained with respect to each actuator may be determined for the optimal proportional gains of each actuator. Then, the minimum gain of the optimal proportional gains of each actuator determined as described above is set to the proportional gain of the control system. Moreover, in the above embodiment, there has been described an example of obtaining an optimal proportional gains, which change according to the vehicle speed representing the motion state of the vehicle, a disturbance, or the achievement rate of the target value representing the actuation state of an actuator. However, an optimal proportional gains, which change according to a factor other than the motion state of the vehicle, the disturbance, and the actuation states of the actuators may be obtained. Moreover, in the above embodiment, the DYC actuator is used for a brake actuator which imparts a braking force to the wheels. However, the DYC actuator may be used for a driving actuator which imparts a driving force to the wheels. In this manner, the present invention may be varied without departing from the scope of the invention.

What is claimed is:

1. A momentum control apparatus for feedback-controlling the momentum of a controlled object by using a plurality of actuators, comprising:
   a target momentum obtaining part that obtains a target momentum of the controlled object;
   an optimal feedback gain obtaining part that obtains a plurality of optimal feedback gains used when each of the plurality of actuators is independently actuated to feedback-control the momentum of the controlled object, with respect to each of actuators;
   a feedback gain setting part that extracts a minimum feedback gain out of the plurality of optimal feedback gains obtained by the optimal feedback gain obtaining part, and sets the minimum feedback gain as a feedback gain;
   a control amount calculation part that calculates a feedback control amount on the basis of the minimum feedback gain extracted and set as the feedback gain by the feedback gain setting part and a deviation between the target momentum and the current momentum of the controlled object; and
   an actuator control part that controls the actuation of the plurality of actuators on the basis of the feedback control amount.

2. The momentum control apparatus according to claim 1, wherein the optimal feedback gain obtaining part obtains the optimal feedback gains which change according to the motion state of the controlled object, a disturbance, and the actuation states of the plurality of actuators.

3. The momentum control apparatus according to claim 1, further comprising a gain table storage part that previously stores a gain table representing a relation between at least one of the motion state of the controlled object, the disturbance, and the actuation states of the plurality of actuators, and the optimal feedback gains of the plurality of actuators,
   wherein the optimal feedback gain obtaining part obtains the optimal feedback gains on the basis of at least one of the motion state of the controlled object, the disturbance, and the actuation states of the plurality of actuators by referencing the gain table stored in the gain table storage part.

4. The momentum control apparatus according to claim 1, wherein the controlled object is a moving vehicle; and the momentum is a yaw rate of the vehicle.

5. The momentum control apparatus according to claims 1, wherein the plurality of actuators include a front steering actuator actuated to turn the front wheels of the vehicle, a rear steering actuator actuated to turn the rear wheels of the vehicle, and a DYC actuator actuated to impart a braking force or a driving force to the wheels.

* * * * *